US006105347A

United States Patent [19]

Behnke

[11] Patent Number: 6,105,347

[45] Date of Patent: Aug. 22, 2000

[54] DEVICE AND METHOD FOR LOCATING AND REMOVING FOREIGN BODIES IN AGRICULTURAL MACHINERY

[75] Inventor: Willi Behnke, Steinhagen, Germany

[73] Assignee: Class Selbstfahrende Erntemaschinen GmbH, Harsewinkel, Germany

[21] Appl. No.: 09/159,151

[22] Filed: Sep. 23, 1998

[30] Foreign Application Priority Data

Sep. 24, 1997 [DE] Germany .......................... 197 42 060

[51] Int. Cl.[7] .......................... A01D 75/18; A01F 12/16; A01F 21/00

[52] U.S. Cl. ...................... 56/10.2 J; 460/2; 56/DIG. 15

[58] Field of Search ............................ 56/10.2 J, 10.2 R, 56/DIG. 15; 460/2, 3; 340/684, 551

[56] References Cited

U.S. PATENT DOCUMENTS

| | | | |
|---|---|---|---|
| 4,193,248 | 3/1980 | Gilleman | 56/10.2 |
| 4,322,937 | 4/1982 | Hollmann | 53/10.2 |
| 4,433,528 | 2/1984 | Bohman | 56/10.2 J |
| 4,758,788 | 7/1988 | Weiss et al. | 56/10.2 J |
| 5,343,676 | 9/1994 | Weiss | 56/10.2 J |

FOREIGN PATENT DOCUMENTS

| | | |
|---|---|---|
| 0 702 248 A2 | 3/1996 | European Pat. Off. . |
| 28 52 126 C2 | 6/1979 | Germany . |
| 28 57 815 C2 | 6/1979 | Germany . |
| 29 46 098 C2 | 4/1980 | Germany . |
| 33 41 071 A1 | 5/1984 | Germany . |
| 247 117 A3 | 7/1987 | Germany . |
| 41 29 113 A1 | 3/1993 | Germany . |
| 43 01 611 A1 | 7/1994 | Germany . |
| 2 299 010 | 3/1996 | United Kingdom . |

*Primary Examiner*—Thomas B. Will
*Assistant Examiner*—Meredith C. Petravick
*Attorney, Agent, or Firm*—Husch & Eppenberger, LLC; Robert E. Muir; Dutro E. Campbell II

[57] ABSTRACT

A conveying device for material to be chopped with conveying rollers comprises a foreign body detection device and a chopper mechanism whose signals are fed to a control device which controls rapid stopping of the conveying rollers when a foreign body detection signal exceeds a predetermined threshold. Upon reversing operation of the conveying rollers, the detection device is used to end the reversing operation when the foreign body is positioned in front of the conveying rollers.

17 Claims, 3 Drawing Sheets

G
22
NF2
24
A
B
NF1
31
3
21
50
1
SP1
23
25

DEVICE AND METHOD FOR LOCATING AND REMOVING FOREIGN BODIES IN AGRICULTURAL MACHINERY

BACKGROUND OF THE INVENTION

The present invention relates generally to agricultural machinery such as harvesting machines and, more particularly to such a machine including a conveying device having conveying rollers with a metal foreign body detection device mounted in front of a chopper mechanism. The detection device controls rapid stopping of the conveying rollers whenever a foreign body is detected in a foreign body detection region of the conveying device, before the foreign body reaches the chopper mechanism.

A device of this kind is known from German Patent 4 129 113 A1. Whenever the conveying rollers are stopped because of detection of a foreign body, it is necessary to remove the foreign body from the conveying region so that the chopper mechanism is not encumbered by it. In some cases the foreign body leaves the conveying zone without further action through a gap between two conveying rollers arranged one behind the other. Often, however, the conveying direction must be reversed so that the foreign body can be removed from in front of the first conveying rollers or so that the foreign body is caused to drop out. Sometimes during reversed conveying the foreign body is picked up and entrained by the upper ribbed conveying roller, which generally is a pressure roller. Upon return to forward rotation the foreign body drops into the conveying path, that is, directly in front of the chopper and into the chopper mechanism. Also the foreign body frequently can be found only after long searching because the region of detection of the detection device is spatially extensive. Moreover, the rapid stop leaves a different path of conveying, depending upon the speed of conveying at the moment of switching. This makes it even more difficult to locate the foreign body. The sensitivity and filter properties of the detection device are influenced as a function of conveying speed signals and the gap width between the pressure roller and conveying drive roller. Thus, foreign bodies are detected from a critical size onward.

Also it is known from German Patent 4 301 611 A1 that several magnetic pole regions and detector coils can be arranged in the direction of conveying and transversely to the direction of conveying. As a result, various wanted signals are picked up in different regions of the path of conveying and hence extensive compensation of interference signals, which arise due to magnetic field-active structures, particularly transverse ribs, on the conveying rollers occurs.

It is an object of the invention to overcome one or more of the deficiencies described above.

It is another object to facilitate the removal of detected foreign bodies from the conveyor of an agricultural machine; and/or to improve the location for such removal.

SUMMARY OF THE INVENTION

In accordance with the present invention there is provided an agricultural machine having conveying rollers; a chopper mechanism; a foreign body metal detection device mounted in front of the chopper mechanism for detecting unwanted foreign bodies in a foreign body detection region; means associated with the detection device for rapid stopping of the conveying rollers before a foreign body reaches the chopper mechanism; and means operative after a rapid stop of the conveying rollers, for reversing the same in a controlled manner so that backward conveying takes place until the foreign body has again passed through the foreign body detection region.

In accordance with another feature there is provided a method of operating a conveying device on a harvesting machine having conveying rollers and a chopper mechanism, including the steps of: detecting whenever a foreign body enters a detection region adjacent the conveying rollers; stopping the conveying rollers before the foreign body reaches the chopper mechanism; and after stopping, reversing the conveying rollers until the foreign body has passed back through the detection region.

After rapid stopping, the backward conveying takes place in a controlled fashion until the foreign body has again passed through or left the foreign body detection region.

The invention makes use of the existing measuring and locating means to control backward conveying in such a way that foreign objects to be removed are readily accessible in a narrowly limited region in front of the conveying rollers. Backward conveying is advantageously carried out until an upper conveying roller has entrained the foreign body to the highest circumferential point thereof.

Using the measurement of revolution of the upper conveying roller limits the range of backward rotation. In certain circumstances, this prevents metal foreign bodies picked up in the supply region from being deposited by the conveying chopper in front of the chopper mechanism, which would cause damage upon the advancing again.

Advantageously it is provided that after the control device reverses the conveying process, the operator is offered an indication of whether the foreign body was detected again during backward conveying. If the foreign body is not detected, the foreign body has usually left the conveying zone through a gap in the conveying channel and a search is unnecessary.

The metal foreign bodies which may damage the chopper mechanism and which must not get into the feedstuffs can be a variety of different objects such as bolts, bars, chains, wires and bushes or sheet metal parts which can lie longitudinally, transversely or in any other direction and at any level relative to the conveying zone. Therefore, these different foreign bodies may remain for a longer or shorter distance and time in the detector region and also may cause differing characteristic detector signals. Since the length of the braking distance of the rapid stop brake varies, depending upon its adjustment and state as well as on the respective speed of conveying and quantity, the detected metal foreign object may or may not have already left the detector region when braking is over. Therefore, it is advantageous if, when tracing the foreign body, there is distance measurement with the angle transmitter signals of a conveying roller, which are used in detail for detector control, from the moment of first detection thereof until stopping. Furthermore, it is advantageous to measure the length of the object by means of the transmitter signals, which occur during the detector signal.

These measurements make it possible to monitor the position during return because within the scope of the tolerances, which occur due to a change of position in the stream of feedstuffs, and the differences in response thresholds of the detector with the decreasing or increasing speed of the conveying device, it can be assumed that a measurement of extent and position during return shows similar results. Therefore, during backward transport the angle transmitter signals of the conveying roller are evaluated and a tolerance comparison is made with the previously measured and stored admissible values. In case of substantial deviations from the expected measurement results, such deviations are reported to the operator, just as the extent of the object is signaled to the operator. This information serves as an important aid in locating and identifying the unwanted object. Even if the object is no longer detected during reversal, this fact is reported to the operator.

In addition or as an alternative to the position information provided by the angle transmitter signals, position information is also contained in the detector signal or detector signals where several induction detector coils are arranged on the magnets. The signals in each case consist of a positive and a negative part wave, which arise when the object enters and leaves the magnetic field, in different regions of the conveying channel. In the event that the magnet assembly includes a T-shaped yoke, whose yoke arms extend in the direction of conveying, signal rise and signal decay occur in two different regions of the conveying zone. If separate coils are arranged on the arms, then the signals occur there separately and are to be spatially allocated. Thus, the entry and exit of the object can be detected by zones by evaluating the signals and their direction of rise. The time ratio of the signals and their differentials indicate the length of the object. It should be noted that in certain circumstances the speed of the material being conveyed is not constant due to braking or starting. Correlating the different signal components to the angle transmitter signals is therefore helpful to achieve even greater accuracy.

Two different ways are provided for detecting the object according to position and size, upon entry and during backward transport. As a result, there is increased safety due to the fact that the backward motion is ended at almost the exact same time that the object is positioned at the entrance to the conveying rollers and has left them completely. Moreover the angle transmitter pulses are also used to fix the limit for backward transport, so that the foreign body, if it has been picked up by the upper roller, is not conveyed over the upper roller.

A further improvement in the device is yielded by separate evaluation of the sensor signals, divided into several sensor segments across the width of the conveyor, which is customary to reduce interference. Using a new type of circuitry, the signals of the individual coils, which are generated essentially synchronously by the interfering rotating and/or vibrating machine parts, are advantageously averaged and in each case subtracted from the individual coil signals, so that only the foreign body interference in sections is emphasized as difference signals, thereby indicating the position of the foreign body. These individual difference signals are processed and compared with a threshold value and indicated to the operator after they occur, allowing the operator to search for the interfering object within a much narrower space.

The necessary signal links and processing can be done by circuitry or, after digitalization of the signals, by software. The known inversely speed-dependent signal gain or speed-dependent signal attenuation before digitalization is preferably used to achieve a good signal/noise ratio.

A further development of the device is that the magnet sensor assembly, which is usually accommodated in the conveying roller, is mounted pivotally about an axis parallel to the roller axis or about the roller axis itself and connected to a pivot drive.

As a result, the position finding region can be displaced in a direction toward the chopper and any objects which may be located between the conveying roller and a subsequent roller can be detected at any given time during pivoting itself or during the subsequent reversing movement of the conveying device. However, this must be performed in a sufficiently rapid manner to obtain a usable signal during pivoting.

Backward transport of the object and its end position are verified exactly and accordingly indicated to the operator by means of backward pivoting of the detector device to the entrance. The pivot movement can also be performed dynamically through a preset angle of adjustment, so that a detector signal is generated continuously when there are metal parts in the fluctuating field region.

Also by pivoting the detector device into a position symmetrical to the interfering rotating components of the conveying device, minimization of the interference level can be achieved, as the signals have opposite poles during entry and exit of the conveying ribs and they are periodic due to the ribs distributed evenly over the circumference.

Instead of the known magnetic/electrodynamic sensors under consideration here, detectors with static magnetic field sensors can also be used. These sensors have the advantage of taking up speed-independent magnetic field variations due to unwanted ferromagnetic objects, even at a standstill. However, other metal objects can also be verified with these sensors only dynamically. A combination of electrodynamic and magnetostatic sensors can be used advantageously according to the invention by evaluating the signals during backward conveying.

A further advantageous use of the device produces checking of the rapid cutout coupling for its switching behavior, so that the redundancy in the path of conveying from triggering of rapid stopping until stopping of conveying is so great that no foreign object will invade the chopper mechanism. For this purpose, while the conveyer is running, rapid triggering is repeatedly triggered with a key signal and in each case the distance of conveying is determined by counting the rotary transmitter pulses. The release latch of the stop coupling is electromagnetically operated and must cover a switching distance before it engages a locking tooth on a ring gear in order to be held fast. There is the risk of delayed locking if the latch movement is too slow or if wear of the locking teeth has progressed. Moreover there is a switching distance tolerance due to the distance between the locking teeth. Therefore several rapid cutout means are advantageously triggered and the respective conveying distance is determined by counting the rotary angle transmitter pulses. The highest count is used with a tolerance supplement as the threshold value for the subsequent checks of the rotary transmitter pulses, which have been reached at any given time in case of rapid cutouts. If the limit value is exceeded, an indication is given which determines whether maintenance and checking of the rapid switching device is necessary.

BRIEF DESCRIPTION OF THE DRAWINGS

Reference is now made to the drawings which illustrate the best known mode for carrying out the invention and wherein.

DETAILED DESCRIPTION

Figure 1:
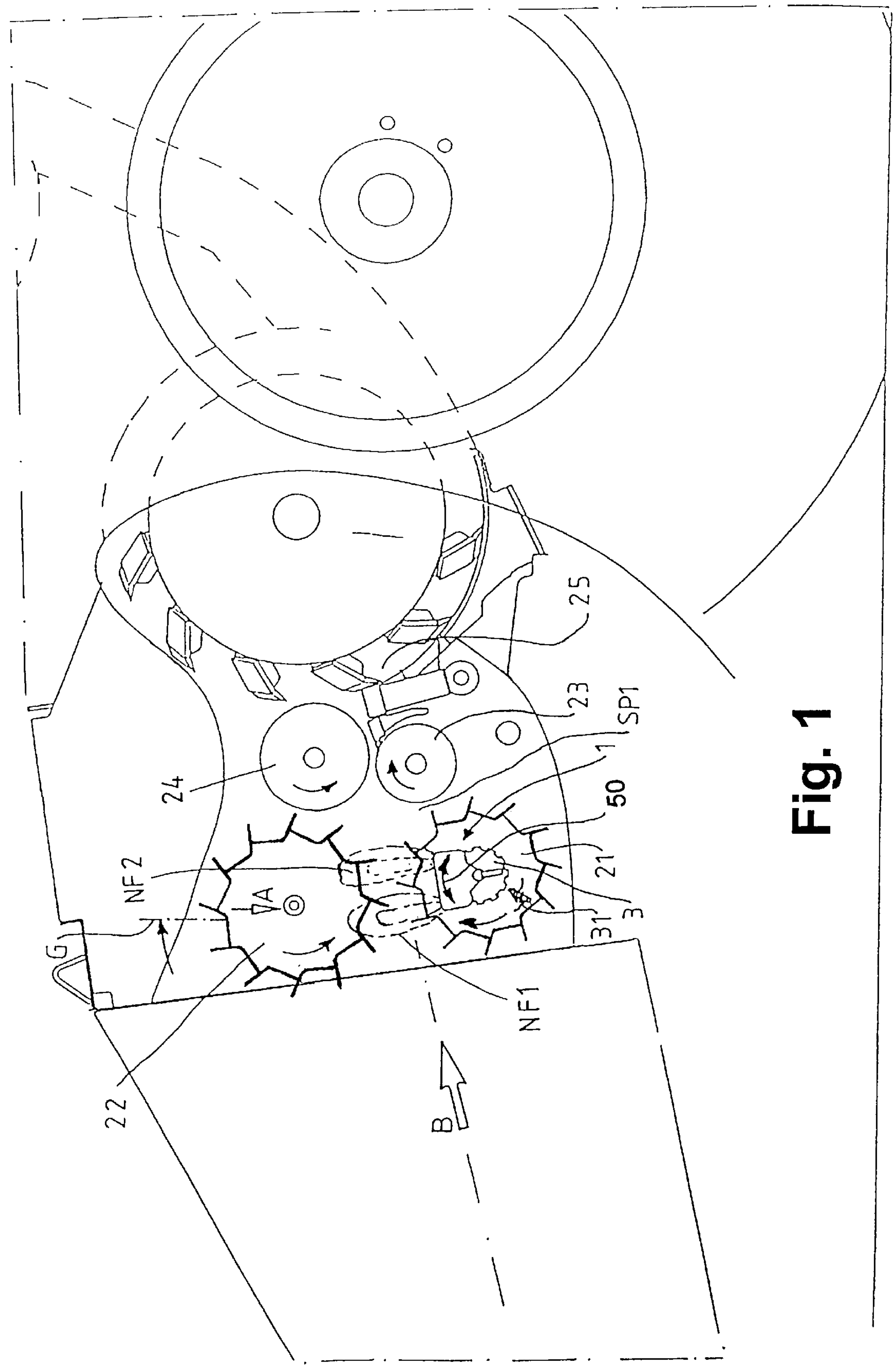
FIG. 1 is a side view of a conveying and chopping mechanism with part of the cover removed for better illustration.

FIG. 1 shows a detail of a harvesting apparatus whose stream of cut material is supplied via a conveying path B and subsequent pairs of conveying rollers 21–24 to a chopper mechanism 25. The lower conveying roller 21 is driven. The upper conveying roller 22 is vertically pressed by a contact pressure means A to the stream of material and hence against the lower conveying roller 21. The upper and lower conveying rollers 22, 21 are provided with transverse ribs. Downstream, an additional pair of smooth rollers 23, 24 is arranged, and behind them the cutter and the chopping roller 25, which is provided with blades.

A foreign body detection device 1, whose magnetic field beams NF1, NF2 pass through the roller casing and the conveying gap, is arranged in the lower conveying roller 21. An angle transmitter 3, whose angle sensor 31 signals are delivered to a control device in front of the sensor windings of the magnetic detection device, is arranged on the shaft of the conveying roller 21. If a metallic or electrically conductive or ferromagnetic foreign body passes through the magnetic fields NF1, NF2, electrical signals occur in the sensor winding, which are used for rapidly stopping the conveying device comprised of rollers 21–24. During this stop time, i.e. from the stop signal to stopping, the degree of rotation of the conveying roller 21 is determined by means of the angle sensor 31 signals, thereby establishing how far the foreign body has been further transported in a direction toward the chopper 25. Accordingly, the return movement is then controlled and simultaneously the foreign body is checked to determine whether it has left the sensor magnetic field NF1.

If the foreign body is not completely transported back, but leaves the conveying region through the gap SP1 between the lower conveying rollers 21, 23 in the braking time or during initial reversal, this is detected by the absence of sensor signals during reverse movement and signaled to the operator. In the absence of indication of passage of a foreign object during reverse movement of the conveying rollers 21, 23, the reverse movement is limited in such a way that on no account can the object be unknowingly entrained by the pressure roller 22. The degree of reverse rotation is continuously determined by means of the angle transmitter 3 and angle sensor 31, and upon reaching a predetermined limit angle G, reverse transport is stopped. Advantageously, the reverse movement of the upper conveying roller 22 can be even more accurately measured by an angle transmitter mounted thereon (not shown) which is like angle transmitter 3 and angle sensor 31.

An advantageous embodiment the foreign body sensor 1 is provided with a pivot or swing drive 50 (see FIG. 5) which allows the sensor to detect foreign bodies as far forward as possible during entry into the rollers 21, 22. Likewise, the pivot drive 50 allows the sensor 1 to detect foreign bodies as far rearwardly as possible on the chopper side after rearward pivoting. The sensor 1 may also detect foreign bodies in the rear gap SP1. Thus a foreign body can be detected in the whole conveying region in front of the chopper 25 and, after forward pivoting or repeated pivoting, detected or traced as far forward as the position of removal at the entrance to the conveying rollers 21, 22. The pivoting arrangement makes it possible to adjust the sensor beams NF1, NF2 (see FIG. 1 or 3) symmetrically to the passage of the interference-producing ribs of the conveying rollers 21, 22, so that the periodic unwanted signals generated thereby are largely compensated. This is the case particularly when the ribs of the conveying rollers 21, 22, which are located in the region of the magnetic sensor field beams NF1, NF2, are spaced apart such that the distances between them correspond to the spaces of the field edges and thus the successive entering and exiting ribs in each case generate oppositely polarized sensor signals. As shown in FIG. 1, the upper conveying roller 22 has a larger diameter than the lower roller 21 nearly to the extent that the field edges diverge at a distance from the roller surfaces.

Figure 2:
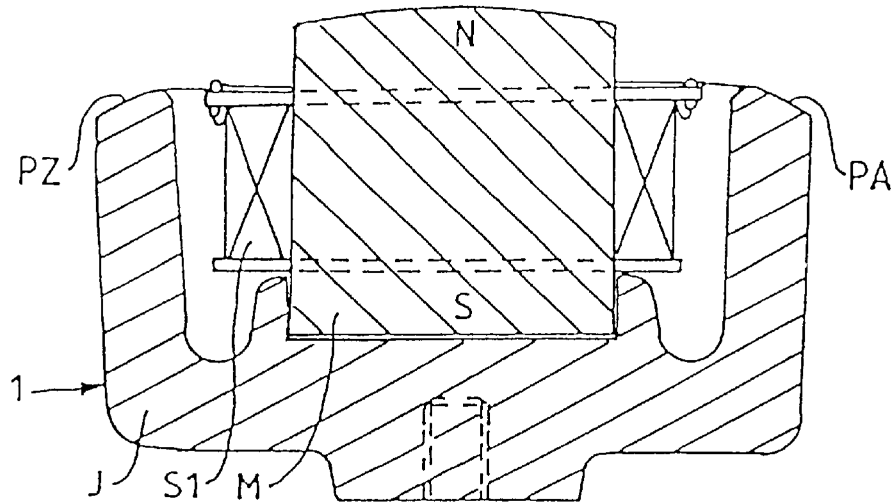
FIG. 2 is a cross-sectional view through a state of the art sensor device.

FIG. 2 is a cross-section through an ordinary magnetic field sensor 1. A U-shaped soft iron yoke J encloses one pole S of the centrally mounted magnet M, so that the yoke arms diverge slightly laterally of the magnet M. The magnetic field beams NF1, NF2 exit, slightly diverging into the space in front, between the free pole of the magnet M and the laterally descending end faces PZ, PA of the yoke arms. A sensor coil S1 is wound around the magnet M so that field variations in the magnetic field due to moving electrically conductive objects induce a voltage therein which is delivered as a sensor voltage.

Figure 3:
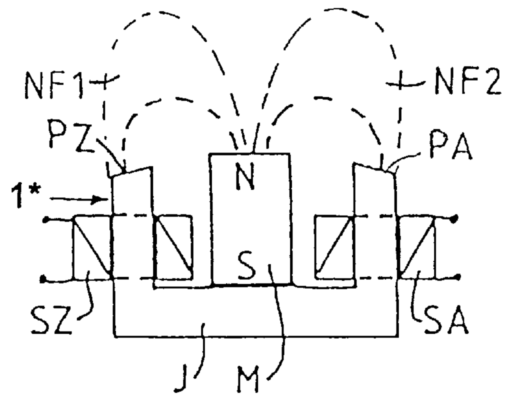
FIG. 3 is a cross-sectional view through another state of the art sensor device.

FIG. 3 shows another known embodiment of the magnetic sensor assembly 1 * in which sensor coils SZ, SA are mounted upon each of the two arms of the yoke J. In this way two separate sensor signals can be obtained, which in each case signal the entry and exit of a conductive object into and out of the associated magnetic field beams NF1, NF2 with corresponding polarity. As a result, the entry and exiting movement of an object can be tracked from the signal sequence of the two sensor signals. Furthermore, a ratio of the movement of the object in the direction of conveying to the distance between and lateral extent of the signal beams NF1, NF2 can be derived. For this purpose the occurrence of the entry and exit sensor signals in relation to their position is picked up to follow the angle sensor signals, taking into account the numbers of angle sensor signals which in each case correspond to the mean field beam width and the mean distance between field beams. Naturally a relative size and position of the object can also be determined based upon the time positions relative to each other, without a correlation to the angle sensor signals. However, there is greater inaccuracy when the speed of the object changes due to braking or acceleration of the stream of material during measurement.

Figure 4:
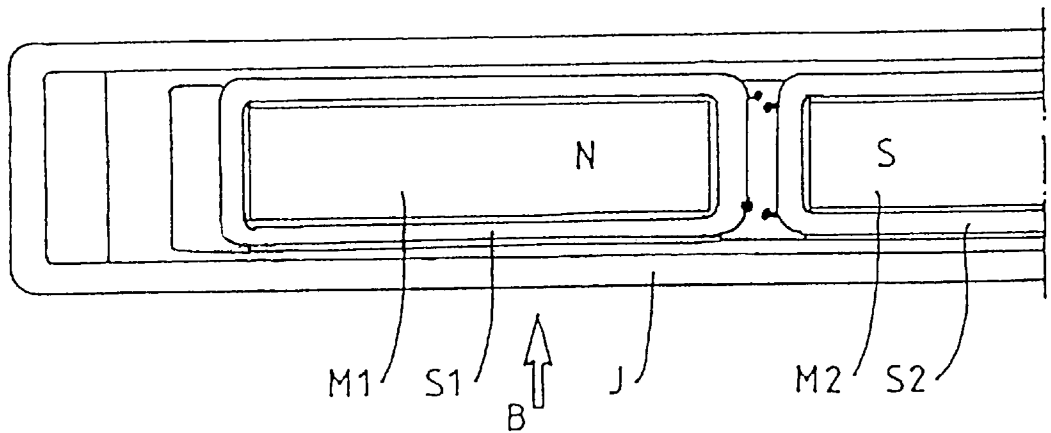
FIG. 4 is a top view of the FIG. 2 sensor device.

FIG. 4 shows a top view of a sensor device. Several elongate magnets M1, M2 etc. are arranged transverse to the conveying path B and slightly spaced from each other in the common U-shaped yoke J. Each magnet M1, M2 has its own sensor winding S1, S2, and their poles N, S are arranged alternately. The field beams from the poles N, S to the yokes J are relatively narrow in the direction of the conveying path B, but elongate from the end pole faces N, S, emerging further according to the greater distance. The signals of the individual coils S1, S2 are advantageously used to compensate for unwanted signals of the moving machine parts occurring with opposite polarity, particularly ribs of the conveying rollers 21, 22. The signals of the individual coils S1, S2 are also individually tested for wanted signals, so that the position of a detected foreign body assigned to the individual sensor section, which substantially facilitates finding the object for removal. The number of magnets and coils is to be selected from practical viewpoints.

Figure 5:
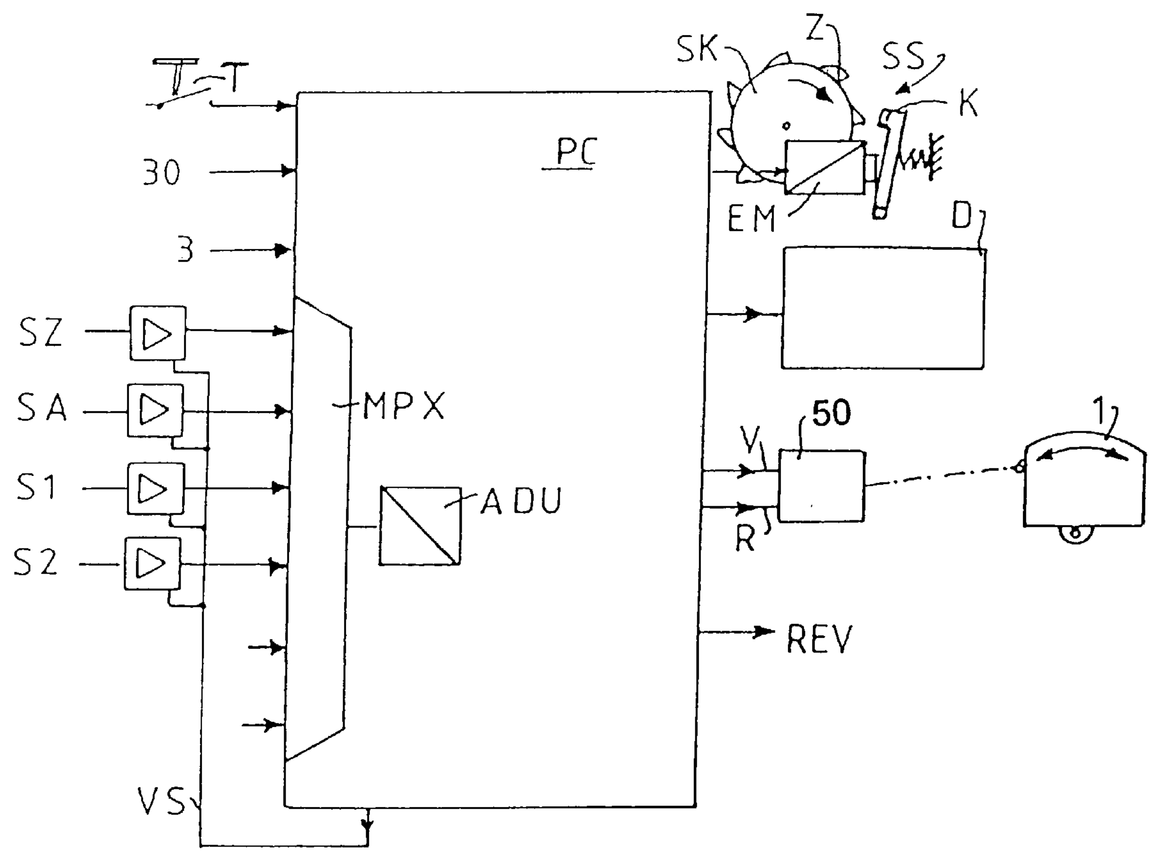
FIG. 5 is a block diagram of a control device for use with the FIG. 1 mechanism.

FIG. 5 shows a circuit with a control processor PC which detects the different sensor signals of the magnetic pick-ups S1, S2; SA, SZ after their initial signal processing. The control processor PC also detects angle transmitter signals of angle transmitter 3 and angle sensor 30 on the conveying rollers 21, 22 and further processes them. Signal preprocessing appropriately concerns controlled amplification or attenuation which makes the signal amplitude ratios largely independent of the rate of advance. The control signal VS for amplification control is derived from the angle transmitter signals.

The process signals of the signal transmitters S1, S2; SA, SZ are conveniently transmitted by a multiplexer MPX to an analogue-to-digital converter ADU and then the signals are further processed digitally. Further processing is used to determine the individual wanted signal components by formation of an interference compensation quantity from the individual signal values and possibly by an adapted filter according to the time sequence of the unwanted signals. The signal transmitters SA, SZ; S1, S2 in FIGS. 3 and 4 exist in a substantially larger number than shown, such number being a function of whether there are sensor coils located one behind the other and/or adjacent each other.

The signals of the different signal transmitter coils are, depending upon direction, compared with matching threshold values. If any of the thresholds is exceeded, the entry or exit of an object into or out of the associated field region is recorded. The first signal to occur serves to activate rapid cutout SS. The first signal also serves to activate commencement of further analysis operations by which, by means of counting of the subsequently occurring angle transmitter signals until further exceeding a limit value or subsequently falling below a limit value, the size and actual or probable position of the object which is the cause are recorded. Moreover the first signal is checked when the angle sensor signals are absent and rapid stopping is performed, for which reversal REV is also triggered. Again, during reversal REV, the sensor signals are evaluated accordingly. The primary criterion for ending reversal REV is proof that the unwanted object has been conveyed in front of the sensor region on the input side, that is, the signal has dropped below the corresponding detection threshold again. In this state the apparatus is stopped and the position and possible size of the object are signaled on the display panel D.

One particular embodiment of the device includes a pivot drive 50 of the sensor device 1 which is driven with forward and reverse control signals V, R by the control device PC when its pick-up range is to be displaced to the input side or to the chopper side of the conveying zone. Also, for the normal foreign body detection mode there is a pivot position in which optimum compensation of the unwanted signals by moving machine parts is achieved. For this purpose the unwanted signal levels, during passage of the sensor device 1 in the conveying mode, are analyzed in correlation to its position and then the respective pivot position is adjusted at which the lowest interference level was detected. During further operation this position is periodically checked by incremental variation and adapted to the respective conditions. In particular when the thickness of the stream of material conveyed from the pressure roller to the driven conveying roller varies, the compensation ratios vary slightly, which is allowed for by continuous rechecking of the compensation setting.

FIG. 5 shows the input of a signal by a key T which is triggered by a circuit for testing purposes of the rapid stop device SS. The angle transmitter pulses are counted to form a limit value or for subsequent checking of the switching device, which occurs from triggering until stopping. The stop device SS consists of a rapidly excited electromagnet EM whose yoke carries a latch K which cooperates with switching teeth Z of a quick-action coupling ring gear SK.

Other objects, features and advantages will be apparent to those skilled in the art. While a preferred embodiment of the present invention have been illustrated and described, this has been by way of illustration and the invention should not be limited except as required by the scope of the appended claims.

I claim:

1. An agricultural machine having conveying rollers; a chopper mechanism; a foreign body metal detection device mounted in front of the chopper mechanism for detecting unwanted foreign bodies in a foreign body detection region; means associated with the detection device for rapid stopping of the conveying rollers before a foreign body reaches the chopper mechanism; and means operative after a rapid stop of the conveying rollers for reversing the same in a controlled manner so that backward conveying takes place until the foreign body has again passed through the foreign body detection region and sensing means for detecting when the foreign body has passed through the foreign body detection region.

2. A machine according to claim 1, wherein the conveying rollers include an upper conveying roller, and the reversing means is operative for backward conveying until the upper conveying roller has continued rotation for 180° after the foreign body has passed back through the foreign body detection region.

3. A machine according to claim 1, wherein the foreign body metal detection device includes a plurality of sensors arranged adjacent each other transverse of the direction of conveying.

4. A machine according to claim 1, wherein said foreign body metal detection device is pivotally mounted within one of the conveying rollers so that depending on the pivot setting, its range of detection reaches close to the chopper mechanism.

5. A conveying device according to claim 4, wherein said foreign body metal detection device is pivoted to a normal setting in which interference signals are most suppressed.

6. An agricultural machine having conveying rollers; a chopper mechanism; a foreign body metal detection device mounted in front of the chopper mechanism for detecting unwanted foreign bodies in a foreign body detection region; means associated with the detection device for rapid stopping of the conveying rollers before a foreign body reaches the chopper mechanism; and means operative after a rapid stop of the conveying rollers for reversing the same in a controlled manner so that backward conveying takes place until the foreign body has again passed through the foreign body detection region and wherein the foreign body detection device provides detection signals; and including means for sending rotation angle signals of the conveying roller, and processing means for receiving the detection signals, the rotation angle signals and processing the same to measure the length of the foreign body and to measure its position in the conveying region during forward and backward conveying.

7. A machine according to claim 3, wherein the means for sending rotation angle signals includes measuring by respective counting of the rotation angle signals during and after occurrence of the detection signals until rapid stopping and during backward conveying.

8. A machine according to claim 7, including a control console; and wherein said processing means compares the position and length measurements during forward and backward movements to a databank of tolerance standards and excesses over tolerances, and displays the measured values on the control console.

9. A machine according to claim 8, wherein said processing means displays the position of foreign bodies when near the front of the conveying rollers and the absence of detection during backward conveying.

10. A machine according to claim 6, wherein said processing means receives all signals of sensors arranged one behind the other in the direction of conveying and evaluates them individually with respect to the position and length of the foreign body.

11. A machine according to claim 6, wherein said processing means receives and adds signals of several sensors and, in added form, subtracts the signals proportionately from the individual signals to compensate for interference.

12. A conveying device for use on a harvesting machine having a chopper mechanism, the device including conveying rollers, a rotation angle transmitter associated with at least one of the conveying rollers for continuously signalling the angle of rotation thereof, a foreign body metal detection device mounted in front of the chopper mechanism, a control device associated with the detection device for triggering rapid stopping of the conveying rollers before a detected foreign body reaches the chopper mechanism, and means for counting the rotation angle signals from the moment of triggering rapid stopping until such stopping occurs.

13. A conveying device according to claim 12, including means for comparing the rotation angle signal count with a preset limit value.

14. A conveying device according to claim 12, including means for supplying a test signal for the purpose of rapid stopping of the conveying rollers.

15. A conveying device according to claim 14, wherein said means for supplying a test signal includes a key contact of a control device.

16. A conveying device according to claim 12, including means for storing the respective count and storing the highest count plus a tolerance margin whenever the conveying rollers stop after triggering of rapid stopping.

17. A method of operating a conveying device on a harvesting machine having conveying rollers and a chopper mechanism, including the steps of:

detecting whenever a foreign body enters a detection region adjacent the conveying rollers;

stopping the conveying rollers before the foreign body reaches the chopper mechanism;

after stopping, reversing the conveying rollers until the foreign body has passed back through the detection region, and sensing when the foreign body has passed back through the detection region.

* * * * *